United States Patent
Jiang et al.

(10) Patent No.: US 10,266,744 B2
(45) Date of Patent: Apr. 23, 2019

(54) ACCELERATOR USED FOR DRILLING FLUIDS, WATER-BASED DRILLING FLUID AND USAGE THEREOF

(71) Applicant: China University of Petroleum (Beijing), Beijing (CN)

(72) Inventors: Guancheng Jiang, Beijing (CN); Deli Gao, Beijing (CN); Shuo Zhang, Beijing (CN); Yong Wang, Beijing (CN); Xianzhu Wu, Chengdu (CN); Liexiang Han, Beijing (CN); Xiangzeng Wang, Beijing (CN); Chunyao Peng, Beijing (CN); Yinbo He, Beijing (CN); Fan Liu, Beijing (CN); Hongguo Zuo, Beijing (CN); Yongqing Zhang, Beijing (CN); Lili Yang, Beijing (CN); Zhong Li, Beijing (CN); Yanjun Li, Beijing (CN)

(73) Assignee: CHINA UNIVERSITY OF PETROLEUM (BEIJING) (CN)

( * ) Notice: Subject to any disclaimer, the term of this patent is extended or adjusted under 35 U.S.C. 154(b) by 0 days.

(21) Appl. No.: 16/130,704

(22) Filed: Sep. 13, 2018

(65) Prior Publication Data
US 2019/0085232 A1 Mar. 21, 2019

(51) Int. Cl.
*C09K 8/12* (2006.01)
(52) U.S. Cl.
CPC ............ *C09K 8/12* (2013.01); *C09K 2208/28* (2013.01); *C09K 2208/34* (2013.01)
(58) Field of Classification Search
CPC ... C09K 8/12; C09K 2208/28; C09K 2208/34
See application file for complete search history.

(56) References Cited

U.S. PATENT DOCUMENTS

| 4,059,154 A | * | 11/1977 | Braden, Jr. | ............ | C09K 8/584 166/270.1 |
| 2014/0363507 A1 | * | 12/2014 | Haag | ............... | C08G 83/003 424/484 |
| 2016/0257879 A1 | * | 9/2016 | Huang | ............... | C09K 8/94 |

FOREIGN PATENT DOCUMENTS

| CN | 103031117 A | 4/2013 |
| CN | 104357029 A | 2/2015 |
| CN | 104371676 A | 2/2015 |
| CN | 104610485 A | 5/2015 |
| CN | 106318340 A | 1/2017 |

OTHER PUBLICATIONS

Luo et al., Development and Property Study of a New Type of Drilling Accelerator, Offshore Oil, vol. 35, No. 4, Dec. 2015, pp. 63-66 (English Abstract).

* cited by examiner

*Primary Examiner* — Alicia Bland
(74) *Attorney, Agent, or Firm* — Calfee, Halter & Griswold LLP

(57) ABSTRACT

The present invention relates to well drilling field in the petroleum industry, particularly to accelerator used for drilling fluids, water-based drilling fluid and usage thereof. The accelerator contains: sulfonated polyglycerol long-chain fatty acid ester, fatty alcohol polyoxyethylene ether, alcohol ether carboxylate, glycidyl ether, and polyoxyethylene alkylphenol ether; wherein, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:1-10:0.5-10:1-10:1-10. The accelerator provided in the present invention can lubricate the drill bit and drilling tool, prevent accumulation of drill cuttings, reduce friction, and improve rate of penetrate.

12 Claims, No Drawings ently, petroleum exploration and development has turned to complex oil-gas reservoirs, and the increasingly complex subsurface geological conditions, especially the discovery and exploitation of shale gas, has put forward extremely high requirements for the drilling engineering. The technical problems encountered by modern drilling engineering become more and more austere. Most oil fields have a present situation of low drilling speed and frequent occurrence of downhole accidents. A large number of new techniques and methods have been used domestically and abroad to improve the rate of penetrate, and some achievements have been made.

ACCELERATOR USED FOR DRILLING FLUIDS, WATER-BASED DRILLING FLUID AND USAGE THEREOF

CROSS REFERENCE TO RELATED APPLICATIONS

This application claims priority to Chinese Application No. 201710855435.8, filed on Sep. 20, 2017, entitled "accelerator used for drilling fluids, water-based drilling fluid and usage thereof", which is specifically and entirely incorporated by reference.

FIELD OF THE INVENTION

The present invention relates to well drilling field in the petroleum industry, particularly to an accelerator used for drilling fluids, a water-based drilling fluid and usage thereof.

BACKGROUND OF THE INVENTION

As petroleum exploration and development is preceded, petroleum exploitation becomes more and more difficult. In contrast, a large quantity of petroleum is required as the national economy is developed rapidly. It is an urgent task to speed up petroleum development. At present, the drilling engineering is a domain where fund and technology are cast intensively. In the early stage of oil field development, the cost of the drilling engineering accounts for about 50% of the total cost of the entire petroleum engineering; in the modern oil field development, the cost of the drilling engineering has been reduced to about 30% of the total cost of the drilling engineering by virtue of innovations and advancements in drilling techniques. Therefore, the acceleration of drilling speed has a close relation with petroleum exploration and development as well as final benefit.

Presently, petroleum exploration and development has turned to complex oil-gas reservoirs, and the increasingly complex subsurface geological conditions, especially the discovery and exploitation of shale gas, has put forward extremely high requirements for the drilling engineering. The technical problems encountered by modern drilling engineering become more and more austere. Most oil fields have a present situation of low drilling speed and frequent occurrence of downhole accidents. A large number of new techniques and methods have been used domestically and abroad to improve the rate of penetrate, and some achievements have been made.

The Patent Document No. CN10301117B has disclosed an accelerator for well drilling in oil fields, which is composed of the following components: ethylene glycol: 5~10%; tributyl phosphate: 5~10%; Turkey red oil: 5~15%; fatty alcohol polyoxyethylene ether: 5~10%, wherein, the number of polyoxyethylene groups in the fatty alcohol polyoxyethylene ether is 4 or 5, the fatty alcohol polyoxyethylene ether is alkylalcohol polyoxyethylene ether with carbon number 8-10; polyglycerol: 10~20%, wherein, the degree of polymerization of the polyglycerol is 4, 6, or 10; and water, which accounts for the remaining content. The accelerator obtained in this patent is environment friendly and attains lubrication and viscosity reducing effects to a certain degree, but can't efficiently improve the rate of penetrate.

In the drilling engineering, drilling fluids are reputed as the "blood of drilling engineering". The performance of the drilling fluid has direct influence on the speed of drilling work. Therefore, drilling fluids with high performance plays an important role for improving the rate of penetrate and preventing complex accidents during well drilling. However, the water-based drilling fluids that are used widely at present can't meet the requirement for improving the rate of penetrate, and have some problems in well wall stability; oil-based drilling fluids involve problems related with environmental protection and cost. Hence, it is extremely urgent to develop a water-based drilling fluid that can improve the rate of penetrate and save cost.

SUMMARY OF THE INVENTION

The objects of the present invention are to provide an accelerator that is used for drilling fluids and can improve the rate of penetrate, and provide a water-based drilling fluid, and usage of the water-based drilling fluid.

To attain the objects described above, in a first aspect, the present invention provides an accelerator used for drilling fluids, which contains: sulfonated polyglycerol long-chain fatty acid ester, fatty alcohol polyoxyethylene ether, alcohol ether carboxylate, glycidyl ether, and polyoxyethylene alkylphenol ether;

wherein, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:1-10:0.5-10:1-10:1-10.

In a second aspect, the present invention provides a water-based drilling fluid that contains the above-mentioned accelerator.

In a third aspect, the present invention provides a usage of the above-mentioned water-based drilling fluid in oil and gas exploitation.

The accelerator provided in the present invention can attains the following beneficial effects:
1) The accelerator for drilling fluids can infiltrate into and lubricate the shearing surface between the thin flakes of drill cuttings, weaken the bonding between the thin flakes, and reduce the sizes of the drill cuttings, so that the drill cuttings can fall off more easily;
2) The accelerator can prevent accumulation of the drill cuttings;
3) The accelerator can form a hydrophobic film on the metal surfaces of drill bits and BHA (i.e., bottom hole assembly), attain an effect of lubricating the drill bits and drilling tools, and prevent hydrophilic drill cuttings from adhering to the drill bits and BHA and thereby prevent a balling phenomenon;
4) The accelerator can control clay swelling and pore pressure transfer, so as to maintain well wall stability.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides an accelerator used for drilling fluids, which contains: sulfonated polyglycerol long-chain fatty acid ester, fatty alcohol polyoxyethylene ether, alcohol ether carboxylate, glycidyl ether, and polyoxyethylene alkylphenol ether;

wherein, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:1-10:0.5-10:1-10:1-10.

According to the present invention, preferably, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:2-8:1-8:2-8:2-8.

More preferably, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:2-5:1-4:2-5:2-5. With the preferred mixture ratio range in the present invention, an accelerator with better properties can be obtained.

According to the present invention, in the sulfonated polyglycerol long-chain fatty acid ester, the long-chain fatty acid preferably is C10-C18 monomeric organic acid, more preferably is one or more of stearic acid, ricinoleic acid, lauric acid, myristic acid, palmitic acid, oleic acid, and linoleic acid, wherein, the monomeric organic acid refers to an organic acid with a single carboxyl group. More preferably, the long-chain fatty acid is two or more of stearic acid, ricinoleic acid, lauric acid, myristic acid, palmitic acid, oleic acid, and linoleic acid, even more preferably is three or more of stearic acid, ricinoleic acid, lauric acid, myristic acid, palmitic acid, oleic acid, and linoleic acid.

According to the present invention, the sulfonated polyglycerol long-chain fatty acid ester refers to a compound obtained by sulfonating polyglycerol long-chain fatty acid ester so that the polyglycerol long-chain fatty acid ester bears sulfonic groups. Wherein, preferably, the sulfonated polyglycerol long-chain fatty acid ester is prepared by a method comprising the following steps:

(1) controlling glycerol to have a dehydration-condensation reaction in the presence of an alkaline compound, obtaining a product of the dehydration-condensation reaction;
(2) controlling the product of the dehydration-condensation reaction and a long-chain fatty acid to have an esterification reaction in the presence of an alkaline compound, obtaining a product of the esterification reaction;
(3) controlling the product of the esterification reaction to have a sulfonation reaction in the presence of a sulfonating agent, wherein, obtaining a product of the sulfonation reaction, the product of the sulfonation reaction is the sulfonated polyglycerol long-chain fatty acid ester;

wherein, preferably, the molar ratio of the glycerol:the long-chain fatty acid:the sulfonating agent calculated in $SO_3$ is 1:0.5-1.2:1-1.5, more preferably is 1:0.8-1.2:1-1.3.

The alkaline compound may be, for example, one or more of sodium hydroxide, potassium hydroxide, sodium carbonate, and potassium carbonate, as long as it can promote the dehydration-condensation reaction and the esterification reaction.

Wherein, in the step (1), the dose of the alkaline compound may vary within a wide range. Preferably, the molar ratio of the glycerol to the alkaline compound is 1:0.01-0.05.

Wherein, in the step (2), the reaction happens on the basis of the reaction in the step (1). Therefore, the alkaline compound must be added again. The dose of the alkaline compound may vary within a wide range. Preferably, the molar ratio of the long-chain fatty acid to the alkaline compound is 1:0.01-0.05.

According to the present invention, preferably, in the step (1), the conditions of the dehydration-condensation reaction include: temperature: 200-240° C., time: 3-6 h. More preferably, the conditions of the dehydration-condensation reaction include: temperature: 220-240° C., time: 4-6 h.

Through the above-mentioned step (1), polyglycerol at a degree of polymerization equal to 5-8 can be obtained.

According to the present invention, in the step (2) of the method for preparing the sulfonated polyglycerol long-chain fatty acid ester, the polyglycerol obtained in the step (1) is controlled to have a reaction with the long-chain fatty acid, so that the hydroxyl group in the polyglycerol and the carboxyl group in the long-chain fatty acid have an esterification reaction, to obtain polyglycerol on which the long-chain fatty acid is grafted by esterification modification. It is deemed that essentially all the long-chain fatty acid participates in the reaction in the step (2).

Wherein, preferably, in the step (2), the conditions of the esterification reaction include: temperature: 70-100° C., time: 2-6 h. More preferably, the conditions of the esterification reaction include: temperature: 75-90° C., time: 3-5 h.

After the esterification reaction, it is deemed that essentially all of the side hydroxyl groups and terminal hydroxyl groups of the polyglycerol are grafted with the chain of esterified long-chain fatty acid.

According to the present invention, in the step (3), the product of the esterification reaction is controlled to have a sulfonation reaction with the sulfonating agent, so that the polyglycerol modified by esterification bears sulfonic groups.

The sulfonating agent may be any conventional sulfonating agent in the art, and there is no particular limitation on the sulfonating agent in the present invention. For example, the sulfonating agent may be one or more of sulfuric anhydride and fuming sulfuric acid.

According to the present invention, preferably, in the step (3), the conditions of the sulfonation reaction include: temperature: 70-100° C., time: 2-6 h. More preferably, the conditions of the sulfonation reaction include: temperature: 75-90° C., time: 3-5 h.

The sulfonated polyglycerol long-chain fatty acid ester preferably is a product directly prepared with the above-mentioned method without any purification.

According to the present invention, the fatty alcohol polyoxyethylene ether refers to an addition polymerization product of fatty alcohol and ethylene oxide, and preferably is one or more of AEO-5 (an ether product of a C7-C9 fatty alcohol and a polyoxyethylene with 5 ethylene oxide repeat groups), AEO-8 (an ether product of a C12-C16 fatty alcohol and a polyoxyethylene with 8 ethylene oxide repeat groups), AEO-9 (an ether product of a C12-C16 fatty alcohol and a polyoxyethylene with 9 ethylene oxide repeat groups), and AEO-10 (an ether product of a C12-C16 fatty alcohol and a polyoxyethylene with 10 ethylene oxide repeat groups). The fatty alcohol polyoxyethylene ether may be a commercial product, such as the O series or MOA series from Jiangsu Haian Petroleum Chemical Factory, etc.

According to the present invention, the alcohol ether carboxylate may be a sodium salt of alcohol ether carboxylic acid (alkylether carboxylic acid), and may also be a commercial product, such as one or more of the AEC series with a generic chemical formula RO-(EO)n-CH2COONa(H), such as AEC-9Na (a sodium salt product of a C12-C14 fatty alcohol and a polyoxyethylene with 9 ethylene oxide repeat groups), AEC-10Na (a sodium salt product of a C12-C14 fatty alcohol and a polyoxyethylene with 10 ethylene oxide repeat groups), AEC-H (a sodium salt product of a C12-C14 fatty alcohol and a polyoxyethylene with 1 ethylene oxide repeat groups), IAEC-7Na (a sodium salt product of a C10-C13 fatty alcohol and a polyoxyethylene with 7 ethylene oxide repeat groups), and AEC-9H (a sodium salt product of a C12-C14 fatty alcohol and a polyoxyethylene with 9 ethylene oxide repeat groups), etc.

According to the present invention, preferably, the glycidyl ether is one or more of ethylene glycol diglycidyl ether, 1,4-butylene glycol diglycidyl ether, bisphenol A diglycidyl ether, 1,2-cyclohexanediol diglycidyl ether, polyethylene glycol diglycidyl ether, polypropylene glycol diglycidyl ether, trimethylolpropane triglycidyl ether, glycerol triglycidyl ether, and pentaerythritol glycidyl ether.

Wherein, in a preferred embodiment of the present invention, the glycidyl ether consists of a first glycidyl ether and a second glycidyl ether, wherein, the first glycidyl ether is one or more of ethylene glycol diglycidyl ether, 1,4-butylene glycol diglycidyl ether, bisphenol A diglycidyl ether, 1,2-cyclohexanediol diglycidyl ether, trimethylolpropane triglycidyl ether, glycerol triglycidyl ether, and pentaerythritol glycidyl ether; the second glycidyl ether is polyethylene glycol diglycidyl ether and/or polypropylene glycol diglycidyl ether. Preferably, the weight ratio of the first glycidyl ether to the second glycidyl ether is 1:0.2-3, more preferably is 1:0.5-2.

According to the present invention, preferably, the polyoxyethylene alkylphenol ether is one or more of polyoxyethylene nonylphenol ether, polyoxyethylene sec-octylphenol ether, polyoxyethylene octylphenol ether, polyoxyethylene dodecylphenol ether, and polyoxyethylene dinonylphenol ether. The polyoxyethylene alkylphenol ether may be a commercial product.

Wherein, for example, the polyoxyethylene nonylphenol ether may be one or more of TX-4 (a product of nonylphenol and polyoxyethylene with 4 ethylene oxide repeat groups), TX-5 (a product of nonylphenol and polyoxyethylene with 5 ethylene oxide repeat groups), TX-7 (a product of nonylphenol and polyoxyethylene with 7 ethylene oxide repeat groups), TX-9 (a product of nonylphenol and polyoxyethylene with 9 ethylene oxide repeat groups), and TX-10 (a product of nonylphenol and polyoxyethylene with 10 ethylene oxide repeat groups), such as the TX series from Jiangsu Haian Petroleum Chemical Factory.

Wherein, for example, the polyoxyethylene sec-octylphenol ether may be one or more of SOPE-4 (a condensation product of sec-octylphenol and polyoxyethylene with 4 ethylene oxide repeat groups), SOPE-7 (a condensation product of sec-octylphenol and polyoxyethylene with 7 ethylene oxide repeat groups), and SOPE-10 (a condensation product of sec-octylphenol and polyoxyethylene with 10 ethylene oxide repeat groups), such as the SOPE series from Jiangsu Haian Petroleum Chemical Factory.

Wherein, for example, the polyoxyethylene octylphenol ether may be one or more of OP-4 (a condensation product of octylphenol and polyoxyethylene with 4 ethylene oxide repeat groups), OP-7 (a condensation product of octylphenol and polyoxyethylene with 7 ethylene oxide repeat groups), OP-9 (a condensation product of octylphenol and polyoxyethylene with 9 ethylene oxide repeat groups), and OP-10 (a condensation product of octylphenol and polyoxyethylene with 10 ethylene oxide repeat groups), such as the OP series from Jiangsu Haian Petroleum Chemical Factory.

In a second aspect, the present invention provides a water-based drilling fluid that contains the above-mentioned accelerator.

According to the present invention, preferably, with respect to 100 pbw water in the water-based drilling fluid, the content of the accelerator is 0.2-0.8 pbw.

Usually, the water-based drilling fluid may further contain other additives for water-based drilling fluid; preferably, the drilling fluid in the present invention contains one or more of bentonite, pH adjuster, filtrate reducer, weighting agent, inhibitor, and protectant, etc.

Wherein, the bentonite is a kind of clay with montmorillonite as the main mineral component, which can render viscous shearing strength, leak-off and wall building capabilities to the drilling fluid; for example, the bentonite may be sodium bentonite and/or calcium bentonite, preferably is sodium bentonite. More preferably, with respect to 100 pbw water in the water-based drilling fluid, the content of the bentonite is 2-5 pbw, more preferably is 2-3 pbw.

Wherein, the pH adjuster ensures that the drilling fluid system is an alkaline environment. For example, the pH adjuster may be selected from one or more of sodium hydroxide, potassium hydroxide, potassium carbonate, and sodium carbonate. More preferably, with respect to 100 pbw water in the water-based drilling fluid, the content of the pH adjuster is 0.3-1 pbw.

Wherein, the filtrate reducer can improve the leak-off and wall building capabilities of the drilling fluid. For example, the filtrate reducer may be selected from one or more of polymeric filtrate reducer (trade name: Redul), PAC-LV, ammonium salt, sulfomethylated phenolic resin (e.g., trade name: SMP-I, SMP-II), sulfomethylated lignite resin (e.g., trade name: SPNH), and zwitterionic polymer JT-888, preferably is one or more of Redul, SMP-II and SPNH. More preferably, with respect to 100 pbw water in the water-based drilling fluid, the content of the filtrate reducer is 2-5 pbw.

Wherein, the purpose of the weighting agent is to adjust the density of the drilling fluid to a required density. For example, the weighting agent may be one or more of barite (e.g., barite with 90 wt % or higher barium sulfate content), organic salts (Weigh-1, Weigh-2 (the active ingredient is potassium formate), Weigh-3, and organic sodium salt GD-WT), and inorganic salts (e.g., NaCl, KCl, and $BaSO_4$), etc. Preferably, with respect to 100 pbw water in the water-based drilling fluid, the content of the weighting agent is 4-10 pbw.

Wherein, the inhibitor can inhibit hydrated swelling of the rock formation. For example, the inhibitor may be polyethylene glycol (with number-average molecular weight within a range of 2,000-20,000). More preferably, with respect to 100 pbw water in the water-based drilling fluid, the content of the inhibitor is 2-5 pbw.

Wherein, the protectant can protect the reservoir from water-sensitivity damage brought by the drilling fluid and inhibit hydrated swelling and dispersion of mud shale. For example, such a protectant may be the reservoir protectant disclosed in the Patent Document No. CN 104610485 A. More preferably, with respect to 100 pbw water in the water-based drilling fluid, the content of the protectant is 1-4 pbw.

Each of the above additives may be commercially available products, or may be prepared with conventional methods in the art. They will not be further detailed hereunder.

In a third aspect, the present invention provides a usage of the above-mentioned water-based drilling fluid in oil and gas exploitation.

The accelerator provided in the present invention can lubricate the drill bit and drilling tool, prevent accumulation of drill cuttings, reduce friction, and improve the rate of penetrate.

Hereunder the present invention will be detailed in embodiments.

Example 1

This example is provided to describe the accelerator in the present invention.
(1) under $N_2$ protection, 0.4 mol glycerol and 0.01 mol sodium hydroxide are stirred at 220° C. for 5 h for reaction; thus, a polyglycerol product is obtained (the degree of polymerization of the polyglycerol is 6);
(2) 0.1 mol oleic acid, 0.1 mol stearic acid, and 0.2 mol lauric acid are added into the above polyglycerol product, then 0.02 mol sodium hydroxide is added, and then the obtained mixture is held at 110° C. for 8 h for esterification reaction;
(3) 0.5 mol $SO_3$ is added into the product of esterification reaction, and the obtained mixture is held at 80° C. for 4 h for sulfonation reaction; thus, 173 g sulfonated polyglycerol long-chain fatty acid ester is obtained;
(4) 5 g AEO-9 (emulsifier O-9 from Jiangsu Haian Petroleum Chemical Factory, the same below), 3 g AEC (AEC-9Na from Jiangsu Wan Qi Biotechnology Co., Ltd.), 3 g trimethylolpropane triglycidyl ether, 3 g polypropylene glycol diglycidyl ether (trade name YF-878 from Guangzhou Yifu Chemical Materials Co., Ltd., the same below), and 4 g OP-10 (emulsifier OP-10 from Jiangsu Haian Petroleum Chemical Factory, the same below) are added into 173 g sulfonated polyglycerol long-chain fatty acid ester synthesized above, and the obtained mixture is stirred to a homogeneous state; thus, an accelerator TS-1 is obtained.

Example 2

This example is provided to describe the accelerator in the present invention.
(1) under $N_2$ protection, 0.6 mol glycerol and 0.01 mol sodium hydroxide are stirred at 240° C. for 4 h for reaction; thus, a polyglycerol product is obtained (the degree of polymerization of the polyglycerol is 7);
(2) 0.1 mol oleic acid, 0.1 mol stearic acid, and 0.2 mol lauric acid are added into the above polyglycerol product, then 0.02 mol sodium hydroxide is added, and then the obtained mixture is held at 120° C. for 6 h for esterification reaction;
(3) 0.6 mol $SO_3$ is added into the product of esterification reaction, and the obtained mixture is held at 75° C. for 5 h for sulfonation reaction; thus, 195 g sulfonated polyglycerol long-chain fatty acid ester is obtained;
(4) 6 g AEO-8 (emulsifier O-8 from Jiangsu Haian Petroleum Chemical Factory, the same below), 3 g AEC (AEC-10Na from Jiangsu Wan Qi Biotechnology Co., Ltd.), 5 g ethylene glycol diglycidyl ether, 4 g polypropylene glycol diglycidyl ether, and 4 g OP-9 (emulsifier OP-9 from Jiangsu Haian Petroleum Chemical Factory, the same below) are added into 195 g sulfonated polyglycerol long-chain fatty acid ester synthesized above, and the obtained mixture is stirred to a homogeneous state; thus, an accelerator TS-2 is obtained.

Example 3

This example is provided to describe the accelerator in the present invention.
The method described in the example 1 is used, but in the step (2), the stearic acid is replaced with ricinoleic acid and the oleic acid is replaced with linoleic acid; thus, 174 g sulfonated polyglycerol long-chain fatty acid ester is obtained.
In the step (4), 173 g above polyglycerol long-chain fatty acid ester is mixed with the same other reagents as those in the example 1; thus, an accelerator TS-3 is obtained.

Example 4

This example is provided to describe the accelerator in the present invention.
The method described in the example 1 is used, but in the step (2), the oleic acid and lauric acid are omitted and the dose of the stearic acid is adjusted to 0.4 mol;
In the step (4), 173 g above polyglycerol long-chain fatty acid ester is mixed with the same other reagents as those in the example 1; thus, an accelerator TS-4 is obtained.

Example 5

This example is provided to describe the accelerator in the present invention.
The method described in the example 1 is used, but in the step (2), the stearic acid and lauric acid are omitted and the dose of the oleic acid is adjusted to 0.4 mol;
In the step (4), 173 g above polyglycerol long-chain fatty acid ester is mixed with the same other reagents as those in the example 1; thus, an accelerator TS-5 is obtained.

Example 6

This example is provided to describe the accelerator in the present invention.
The method described in the example 1 is used, but in the step (2), the stearic acid and oleic acid are omitted and the dose of the lauric acid is adjusted to 0.4 mol;
In the step (4), 173 g above polyglycerol long-chain fatty acid ester is mixed with the same other reagents as those in the example 1; thus, an accelerator TS-6 is obtained.

Example 7

This example is provided to describe the accelerator in the present invention.
The method described in the example 1 is used, but in the step (4), the polypropylene glycol diglycidyl ether is omitted and the dose of the trimethylolpropane triglycidyl ether is adjusted to 6 g; thus, an accelerator TS-7 is obtained.

Comparative Example 1

The method described in the example 1 is used, but in the step (1), the sulfonation reaction is not performed and thereby polyglycerol modified by esterification is obtained only.
In the step (4), 173 g above polyglycerol long-chain fatty acid ester is mixed with the same other reagents as those in the example 1, and thereby an accelerator DTS-1 is obtained.

Comparative Example 2

The method described in the example 1 is used, but in the step (4), the dose of the AEO-9 is 1 g, the dose of the trimethylolpropane triglycidyl ether is 0.5 g, the dose of the polypropylene glycol diglycidyl ether is 0.5 g, and the dose of the OP-10 is 1 g; thus, an accelerator DTS-2 is obtained.

Comparative Example 3

The method described in the example 1 is used, but in the step (4), the dose of the AEO-9 is 20 g, the dose of the trimethylolpropane triglycidyl ether is 10 g, and the dose of the polypropylene glycol diglycidyl ether is 10 g; thus, an accelerator DTS-3 is obtained.

Test Example 1

Preparation of base mud: 3 pbw anhydrous sodium carbonate and 40 pbw bentonite (sodium bentonite from Weifang Huawei Bentonite Co., Ltd.) are added into 1,000 pbw water successively while stirring, then the obtained mixture is stirred further for 8 h, and then sealed and kept still for 16 h; thus, a base mud is obtained.

The above base mud is mixed with the accelerator while stirring, and the content of the accelerator is 1 wt %.

The testing method is as follows:

The rheological property and filtration property of the above drilling fluids are measured respectively. Specifically, the apparent viscosity (AV), plastic viscosity (PV), yield point (YP), ratio of initial gel strength/final gel strength (G10″/10′), ratio of yield point to plastic viscosity, medium pressure filter loss (API) of the obtained drilling fluids are measured after aging at 120° C. for 16 h and cooling to room temperature respectively; wherein:

The plastic viscosity (PV) is measured with a FANN six-speed viscosity meter with the method specified in the national standard GB/T29170-2012, in unit of mPa·s, $PV=\theta_{600}-\theta_{300}$.

The apparent viscosity (AV) is measured with a FANN six-speed viscosity meter with the method specified in the national standard GB/T29170-2012, in unit of mPa·s, $$AV = \frac{1}{2}\theta_{600}.$$

The yield point (YP) is measured with a FANN six-speed viscosity meter with the method specified in the national standard GB/T29170-2012, $YP=0.5(2\theta_{300}-\theta_{600})$, in unit of Pa.

The ratio of yield point to plastic viscosity $$= \frac{YP}{\phi_{600} - \phi_{300}},$$

reading the $\phi 600$ and $\phi 300$ sequentially with a six-speed rotational viscometer.

API refers to medium pressure filter loss, and is measured with an medium pressure filter loss meter with the method specified in the standard SY/T5621-93, in unit of mL.

The results are shown in Table 1.

TABLE 1

| | AV mPa·s | PV mPa·s | YP mPa·s | Ratio of yield point to plastic viscosity | G10″/ G10′ | API mL |
|---|---|---|---|---|---|---|
| Base mud | 13 | 5 | 8 | 1.6 | 7/8.5 | 23.2 |
| Base mud + 1 wt % TS-1 | 12.5 | 4 | 8.5 | 2.13 | 6/7.5 | 16.6 |
| Base mud + 1 wt % TS-2 | 12.0 | 3.5 | 8.0 | 2.29 | 6.5/7 | 16.1 |
| Base mud + 1 wt % TS-3 | 12.5 | 4.0 | 8.5 | 2.13 | 6.5/7.5 | 16.7 |
| Base mud + 1 wt % TS-4 | 12.5 | 4.0 | 8.0 | 2.00 | 6.0/7.5 | 16.9 |
| Base mud + 1 wt % TS-5 | 12.0 | 3.5 | 8.5 | 2.43 | 6.5/7.5 | 17.3 |
| Base mud + 1 wt % TS-6 | 13.5 | 3.5 | 8.0 | 2.29 | 6.0/7.0 | 17.1 |
| Base mud + 1 wt % TS-7 | 12.5 | 4.0 | 8.5 | 2.13 | 6.5/8.0 | 17.4 |
| Base mud + 1 wt % DTS-1 | 10.0 | 3.0 | 7.5 | 2.50 | 5.5/6.0 | 21.6 |
| Base mud + 1 wt % DTS-2 | 9.5 | 3.0 | 7.5 | 2.50 | 5.0/6.5 | 22.1 |
| Base mud + 1 wt % DTS-3 | 9.0 | 3.5 | 7.0 | 2.00 | 5.0/6.0 | 21.9 |

It is seen from Table 1: the base mud that employs one of the accelerators TS-1~TS-7 in the present invention has certain filtrate loss reduction effect. Specifically, after a certain amount of accelerator is added, the filtrate loss of the base mud is decreased from 23.2 mL to 18 mL or a lower value.

Test Example 2

The base mud in the test example 1 and the base mud that contains the accelerator are tested for the lubrication coefficient respectively.

Lubrication coefficient test: the extreme pressure lubrication coefficient of the fluid to be tested is measured with a Fann EP extreme pressure lubrication tester after the fluid to be tested is aged at 150° C. for 16 h, and the lubrication coefficient reduction ratio is calculated.

Wherein, lubrication coefficient reduction ratio=(extreme pressure lubrication coefficient of the base mud−extreme pressure lubrication coefficient of the base mud that contains the lubricant)/extreme pressure lubrication coefficient of the base mud×100%. The results are shown in Table 2.

TABLE 2

| | Lubrication coefficient | Lubrication coefficient reduction ratio |
|---|---|---|
| Base mud | 35.0 | / |
| Base mud + 1 wt % TS-1 | 6.6 | 81.1% |
| Base mud + 1 wt % TS-2 | 6.7 | 80.9% |
| Base mud + 1 wt % TS-3 | 6.5 | 81.4% |
| Base mud + 1 wt % TS-4 | 12.5 | 64.3% |
| Base mud + 1 wt % TS-5 | 9.8 | 72.0% |
| Base mud + 1 wt % TS-6 | 10.7 | 69.4% |
| Base mud + 1 wt % TS-7 | 9.2 | 73.7% |
| Base mud + 1 wt % DTS-1 | 23.5 | 32.9% |
| Base mud + 1 wt % DTS-2 | 25.1 | 28.3% |
| Base mud + 1 wt % DTS-3 | 26.6 | 24.0% |

It can be seen from Table 2: the base mud that employs the accelerators TS-1~TS-7 in the present invention can effectively reduce the lubrication coefficient of base mud; especially, the base mud that employs the preferred accelerators in the present invention, the lubrication coefficient reduction ratio is up to 80% or above.

Test Example 3

Surface tension test: clear water and clear water that contains any one of the above accelerators (the content of the accelerator is 1 wt %) are tested for the surface tension with an XG-CAMB1 contact angle meter from Shanghai Xuanyichuangxi Industrial Equipment Co., Ltd. The results are shown in Table 3.

TABLE 3

|  | Surface tension (mN/m) |
| --- | --- |
| Clear water | 71.22 |
| Clear water + 1 wt % TS-1 | 27.33 |
| Clear water + 1 wt % TS-2 | 27.15 |
| Clear water + 1 wt % TS-3 | 27.18 |
| Clear water + 1 wt % TS-4 | 28.92 |
| Clear water + 1 wt % TS-5 | 29.73 |
| Clear water + 1 wt % TS-6 | 29.73 |
| Clear water + 1 wt % TS-7 | 29.24 |
| Clear water + 1 wt % DTS-1 | 46.7 |
| Clear water + 1 wt % DTS-2 | 48.2 |
| Clear water + 1 wt % DTS-3 | 49.3 |

It can be seen from Table 3: after the accelerator is added, the surface tension of the solution is decreased sharply; that indicates the accelerators provided in the present invention can change the surface wettability of drill bit and prevent bit balling; in addition, reducing the surface tension can change the wettability of the rock surface, which allow the drilling fluid entering into the rocks through the tiny fractures between the rocks, the influence of a hold-down effect is reduced, repeated drilling is prevented, and thereby the rate of penetrate is improved.

Test Example 4

The rate of penetrate test: a ZJMN-1 drilling rate simulator is used, and the following parameters are set: drilling depth: 15 cm, rotation speed: 60 r/min., drilling pressure: 0.5 kN, flow rate of drilling fluid: 15 L/min.; the above base mud (for example, the base mud prepared in test example 1) and the base mud that contains 0.4 wt % accelerator are tested for drilling rate, and the drilling rate increase ratio is calculated, wherein, drilling rate increase ratio=(drilling rate of the base mud that contains the accelerator−drilling rate of the base mud)/drilling rate of the base mud×100%.

The results are shown in Table 4.

TABLE 4

|  | Drilling Rate Mm/min | Drilling Rate Increase Ratio/% |
| --- | --- | --- |
| Base mud | 25 | / |
| Base mud + 0.4 wt % TS-1 | 38 | 52.0% |
| Base mud + 0.4 wt % TS-2 | 36 | 44.0% |
| Base mud + 0.4 wt % TS-3 | 37 | 48.0% |
| Base mud + 0.4 wt % TS-4 | 33 | 32.0% |
| Base mud + 0.4 wt % TS-5 | 32 | 28.0% |
| Base mud + 0.4 wt % TS-6 | 34 | 36.0% |
| Base mud + 0.4 wt % TS-7 | 32 | 28.0% |
| Base mud + 0.4 wt % DTS-1 | 28 | 12.0% |
| Base mud + 0.4 wt % DTS-2 | 29 | 16.0% |
| Base mud + 0.4 wt % DTS-3 | 28 | 12.0% |

It can be seen from Table 4: utilizing the accelerator provided in the present invention, the drilling rate is improved significantly; the drilling rate is increased by 28% or more, preferably increased by 30% or more, more preferably increased by 40% or more, e.g., 40-55%.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. An accelerator used for drilling fluids, containing: a sulfonated polyglycerol long-chain fatty acid ester, a fatty alcohol polyoxyethylene ether, an alcohol ether carboxylate, a glycidyl ether, and a polyoxyethylene alkylphenol ether;
wherein, the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:1-10:0.5-10:1-10:1-10.

2. The accelerator according to claim 1, wherein the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:2-8:1-8:2-8:2-8.

3. The accelerator according to claim 1, wherein the weight ratio of the sulfonated polyglycerol long-chain fatty acid ester:the fatty alcohol polyoxyethylene ether:the alcohol ether carboxylate:the glycidyl ether:the polyoxyethylene alkylphenol ether is 100:2-5:1-4:2-5:2-5.

4. The accelerator according to claim 3, wherein the sulfonated polyglycerol long-chain fatty acid ester has a long-chain fatty acid that is a C10-C18 monomeric organic acid.

5. The accelerator according to claim 4, wherein the long-chain fatty acid is one or more of stearic acid, ricinoleic acid, lauric acid, myristic acid, palmitic acid, oleic acid, and linoleic acid.

6. The accelerator according to claim 4, wherein the sulfonated polyglycerol long-chain fatty acid ester is prepared by a method that comprises the following steps:
(1) performing a dehydration-condensation reaction on glycerol in the presence of an alkaline compound to obtain a product of the dehydration-condensation reaction;
(2) performing an esterification reaction on the product of the dehydration-condensation reaction and a long-chain fatty acid in the presence of an alkaline compound to obtain a product of the esterification reaction; and
(3) performing a sulfonation reaction on the product of the esterification reaction in the presence of a sulfonating agent to form a product of the sulfonation reaction, where in the product of the sulfonation reaction is the sulfonated polyglycerol long-chain fatty acid ester;
wherein, the molar ratio of the glycerol:the long-chain fatty acid:the sulfonating agent based on the number of $SO_3$ units in the sulfonating agent is 1:0.5-1.2:1-1.5.

7. The accelerator according to claim 6, wherein in the method for preparing the sulfonated polyglycerol long-chain fatty acid ester,
where in the step (1), the conditions of the dehydration-condensation reaction include:
temperature: 200-240° C., time: 3-6 h;
in the step (2), the conditions of the esterification reaction include: temperature: 70-100° C., time: 2-6 h;
in the step (3), the conditions of the sulfonation reaction include: temperature: 70-100° C., time: 2-6 h.

8. The accelerator according to claim 1, wherein the fatty alcohol polyoxyethylene ether is one or more of an ether product of a C7-C9 fatty alcohol and a polyoxyethylene with 5 ethylene oxide repeat groups, an ether product of a C12-C16 fatty alcohol and a polyoxyethylene with 8 ethylene oxide repeat groups, an ether product of a C12-C16 fatty alcohol and a polyoxyethylene with 9 ethylene oxide repeat groups, and an ether product of a C12-C16 fatty alcohol and a polyoxyethylene with 10 ethylene oxide repeat groups.

9. The accelerator according to claim 1, wherein the glycidyl ether is one or more of ethylene glycol diglycidyl ether, 1,4-butylene glycol diglycidyl ether, bisphenol A diglycidyl ether, 1,2-cyclohexanediol diglycidyl ether, polyethylene glycol diglycidyl ether, polypropylene glycol diglycidyl ether, trimethylolpropane triglycidyl ether, glycerol triglycidyl ether, and pentaerythritol glycidyl ether.

10. The accelerator according to claim 1, wherein the polyoxyethylene alkylphenol ether is one or more of polyoxyethylene nonylphenol ether, polyoxyethylene sec-octylphenol ether, polyoxyethylene octylphenol ether, polyoxyethylene dodecylphenol ether, and polyoxyethylene dinonylphenol ether.

11. A water-based drilling fluid that contains the accelerator according to claim 1.

12. A method for exploring for oil or gas comprising:
employing the water-based drilling fluid according to claim 11 while drilling.

* * * * *